United States Patent [19]
Hirota

[11] Patent Number: 4,682,250
[45] Date of Patent: Jul. 21, 1987

[54] APPARATUS FOR RECORDING A VIDEO SIGNAL SAMPLED AT FREQUENCY $F_s$ AND REPRODUCING THE VIDEO SIGNAL AS A SIGNAL ESSENTIALLY SAMPLED AT FREQUENCY $2F_s$

[75] Inventor: Akira Hirota, Chigasaki, Japan

[73] Assignee: Victor Company of Japan, Ltd., Yokohama, Japan

[21] Appl. No.: 620,016

[22] Filed: Jun. 13, 1984

[30] Foreign Application Priority Data

Jun. 15, 1983 [JP] Japan .................. 58-107379

[51] Int. Cl.$^4$ ...................... H04N 5/78; H04N 9/491; H04N 5/91
[52] U.S. Cl. ............................ 360/33.1; 338/310; 338/335
[58] Field of Search ............ 358/39, 138, 310, 335, 358/12, 21, 37; 360/9.1, 32, 33.1

[56] References Cited

U.S. PATENT DOCUMENTS

| | | | |
|---|---|---|---|
| 3,809,805 | 5/1974 | Kaspizak | 358/335 |
| 4,051,516 | 9/1977 | Weston | 358/13 X |
| 4,065,784 | 12/1977 | Rossi | 358/13 |
| 4,142,205 | 2/1979 | Iinuma | 358/13 |
| 4,227,204 | 10/1980 | Rossi | 358/13 |
| 4,291,331 | 9/1981 | Devereux | 358/13 |
| 4,317,129 | 2/1982 | Favreau | 358/13 |
| 4,323,916 | 4/1982 | Dischert et al. | 358/13 |
| 4,376,948 | 3/1983 | Dishert et al. | 358/13 |
| 4,381,519 | 4/1983 | Wilkinson et al. | 358/21 R |
| 4,387,389 | 6/1983 | Tanigawa | 358/37 |
| 4,437,128 | 3/1984 | Sapkowski | 358/335 |

FOREIGN PATENT DOCUMENTS 1511230  5/1978  United Kingdom .

OTHER PUBLICATIONS

1976 National Telecommunications Conference: Nov. 29, 30; Dec. 1, 1976; Dallas, Texas, pp. 6.4-1 to 6.4-4.
"Extending PCM Video Response Above the Nyquest Limit"; Goldberg; International Broadcasting Convention: London, Eng. (20-24 Sep. 1976), pp. 89-91.
"Frequency Interleaved Sampling of a Color Television Signal", Golding, IEEE Trans. on Coem, vol. CO-M-19, No. 6, Dec. 1971, pp. 967-979.

Primary Examiner—Aristotelis M. Psitos
Attorney, Agent, or Firm—Michael N. Meller

[57] ABSTRACT

A video signal recording and reproducing apparatus comprises a first sampling circuit for sampling a recording video signal which has a band with an upper limit frequency $f_a$ and is to be recorded by a sampling signal having a frequency $f_s$, where the frequencies $f_a$ and $f_s$ satisfying a relation $f_a < f_s < 2f_a$ and an equation $f_s = (2n+1)f_H/2$, n is an integer, and $f_H$ is a horizontal scanning frequency of the recording video signal, a recording and reproducing circuit for recording an output signal of the first sampling circuit on a recording medium and for reproducing the signal from the recording medium, a delay circuit for delaying the signal which is reproduced from the recording medium by the recording and reproducing circuit by a delay time of one horizontal scanning period, a second sampling circuit for alternately sampling input and output signals of the delay circuit by a sampling signal having the frequency $f_s$, and an adding circuit for adding alternately sampled signals from the second sampling circuit, and for obtaining a reproduced output signal which has essentially been sampled at a frequency of $2f_s$.

6 Claims, 10 Drawing Figures

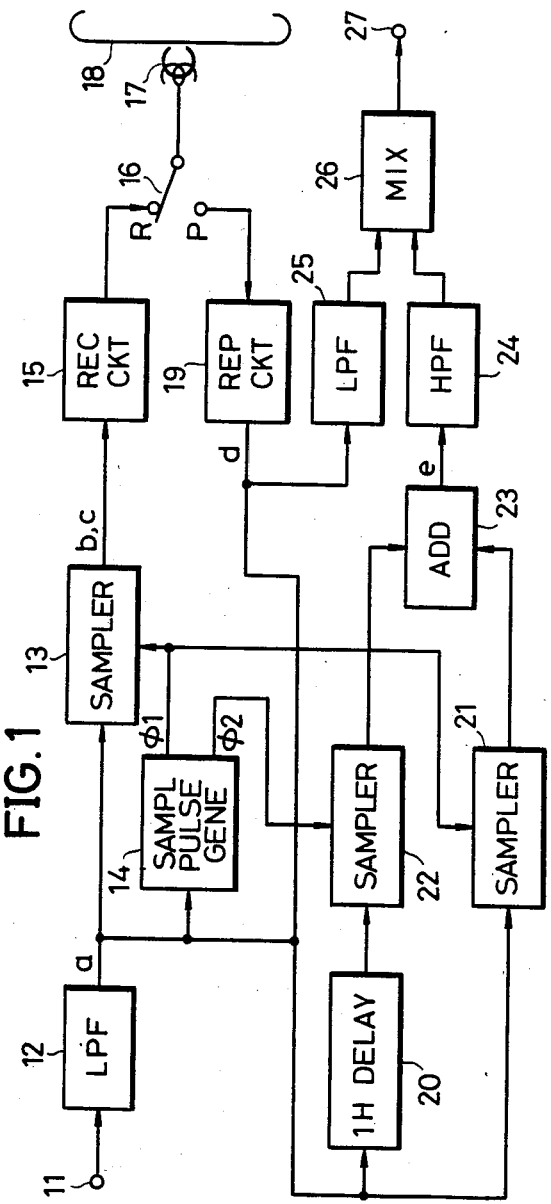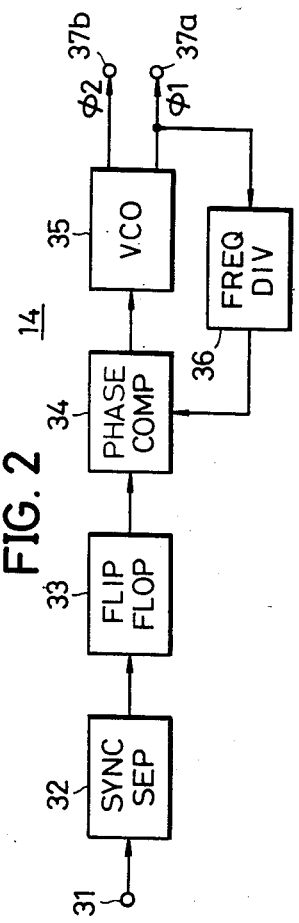

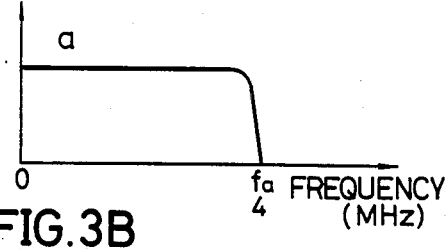
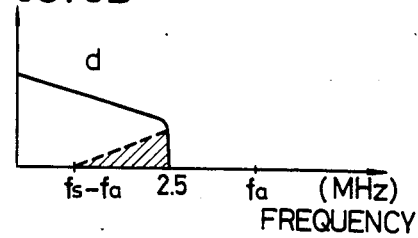
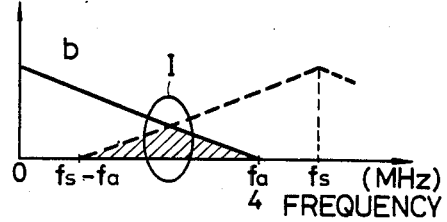
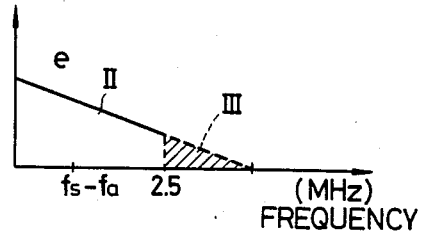
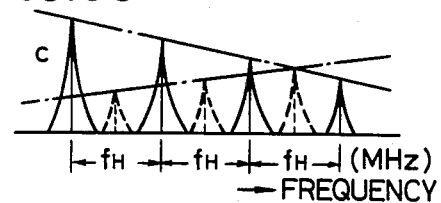
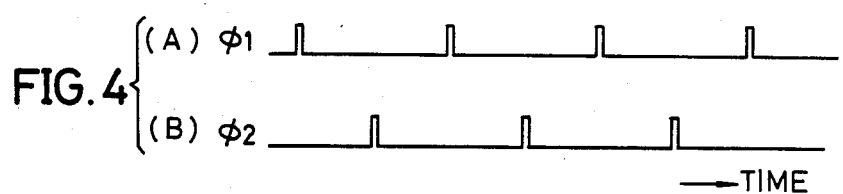
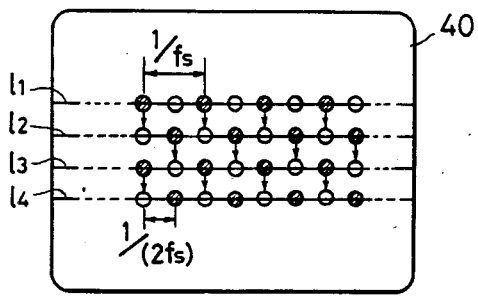

APPARATUS FOR RECORDING A VIDEO SIGNAL SAMPLED AT FREQUENCY $F_s$ AND REPRODUCING THE VIDEO SIGNAL AS A SIGNAL ESSENTIALLY SAMPLED AT FREQUENCY $2F_s$

BACKGROUND OF THE INVENTION

The present invention generally relates to video signal recording and reproducing apparatuses, and more particularly to a video signal recording and reproducing apparatus in which a video signal can be recorded and reproduced in a recording and reproducing system having a relatively narrow band, and a signal reproduced by the recording and reproducing system can be returned to a signal having a band which is wider than the band of the recording and reproducing system.

Generally, in a helical scan type video signal recording and reproducing apparatus, a video signal is recorded on a moving magnetic tape by use of one or a plurality of rotary heads, and the pre-recorded video signal is reproduced by use of the one or a plurality of rotary heads. The video signal has an upper limit frequency which is in the range of 4.2 MHz, for example, and has a wide band. In order to frequency-modulate this video signal having the wide band and record and reproduce the frequency modulated video signal on and from the magnetic tape, a relative linear speed between the head and the magnetic tape must assume a high speed which is greater than a predetermined value, as is well known. Further, it is necessary to employ a high-performance head having a high sensitivity in the high frequency range.

However, in the case of a portable type video signal recording and reproducing apparatus for home use, the cost of the apparatus must be kept to a minimum, the apparatus must be downsized, and the weight of the apparatus must be reduced. And, in order to realize such an apparatus having the reduced cost, size, and weight, the relative linear speed between the head and the magnetic tape must inevitably be set to a speed which is considerably smaller than the predetermined value. For this reason, the recording and reproducing band became narrower than the original band of the video signal, and this interfered with the reproduction of the video signal with a high picture quality.

SUMMARY OF THE INVENTION

Accordingly, it is a general object of the present invention to provide a novel and useful video signal recording and reproducing apparatus in which the problems described heretofore have been eliminated.

Another and more specific object of the present invention is to provide a video signal recording and reproducing apparatus in which a recording video signal is sampled at a frequency $f_s$ which is slightly higher than the band of the recording video signal, the sampled signal is recorded on a recording medium and reproduced from the recording medium, the signal reproduced from the recording medium is delayed by one horizontal scanning period, and the delayed signal and the undelayed signal are alternately sampled at the frequency $f_s$ and mixed, so as to obtain a reproduced video signal which has essentially been sampled at a frequency $2f_s$ which is twice the frequency $f_s$. According to the apparatus of the present invention, it is possible to reproduce signal components in a relatively high frequency range, with a relatively narrow band, and thus, it is possible to obtain a reproduced video signal having a wide band.

Other objects and further features of the present invention will be apparent from the following detailed description when read in conjunction with the accompanying drawings.

BRIEF DESCRIPTION OF THE DRAWINGS

FIG. 1 is a systematic block diagram showing an embodiment of a video signal recording and reproducing apparatus according to the present invention;

FIG. 2 is a systematic block diagram showing an embodiment of a sampling pulse generator within the block system shown in FIG. 1;

FIGS. 3A through 3E show frequency spectrums of signals at each part of the block system shown in FIG. 1;

FIGS. 4(A) and 4(B) are time charts of sampling pulses which are generated from the sampling pulse generator shown in FIG. 2; and FIG. 5 is a diagram for explaining the reproducing principle of the apparatus according to the present invention on a reproduced picture.

DETAILED DESCRIPTION

In FIG. 1, an input recording video signal (a luminance signal will be considered in this case) having a band of 4.2 MHz, for example, is applied to an input terminal 11. The recording video signal is formed into a video signal a shown in FIG. 3A having an upper limit frequency $f_a$ (4 MHz, for example), in a lowpass filter 12. The video signal a is supplied to a sampler 13 and to a sampling pulse generator 14. The sampler 13 samples and holds the video signal a from the lowpass filter 12, by sampling pulses which have a repetition frequency $f_s$ and are generated from the sampling pulse generator 14. As will be described later on in the specification, the frequencies $f_a$ and $f_s$ satisfy a relation $f_a < f_s < 2f_a$. Accordingly, the video signal a is sampled at the sampling frequency $f_s$, and a sampled signal is obtained from the sampler 13.

An embodiment of the sampling pulse generator 14 is shown in FIG. 2. The video signal a from the lowpass filter 12 is applied to an input terminal 31. A synchronizing signal is separated from the video signal a in a synchronizing signal separating circuit 32. The separated horizontal synchronizing signal is frequency-divided by ½ in a flip-flop 33, and a frequency divided output of the flip-flop 33 is supplied to a phase comparator 34. The phase comparator 34 compares the phase of the frequency divided output of the flip-flop 33 and a signal which has a repetition frequency $f_H/2$ and is obtained from a frequency divider 36, where $f_H$ represents the horizontal scanning frequency. An error voltage responsive to the phase difference between the two signals, is produced from the phase comparator 34. The output error voltage of the phase comparator 34 is applied to a voltage controlled oscillator (VCO) 35 as a control voltage, and controls the oscillation frequency of the VCO 35 to the oscillation frequency $f_s$. Output pulses of the VCO 35 are frequency-divided by $1/(2n+1)$ in the frequency divider 36, where n is a natural number. The frequency divider 36 thus produces a signal having a repetition frequency $f_H/2$, and supplies this signal to the phase comparator 34.

Accordingly, a loop which is made up of the phase comparator 34, the VCO 35, and the frequency divider 36, constitutes a known phase locked loop (PLL). Pulses which are in phase with the horizontal synchronizing signal of the recording video signal and have a repetition frequency $f_s$ described by the following equation (1), is produced from the VCO 35.

$$f_s \approx (\tfrac{1}{2}) \cdot (2n+1) f_H \qquad (1)$$

The repetition frequency $f_s$ is selected to a frequency which is less than twice the upper limit frequency $f_a$ of the recording video signal and is greater than the upper limit frequency $f_a$, by taking into account the fact that the recording and reproducing band of the recording and reproducing system is narrow. For example, the repetition frequency $f_s$ is selected to 5.011 MHz when $n=318$ and $f_H=15.734$ kHz. The output pulses $\phi_1$ of the VCO 35 are supplied to the frequency divider 36 as described before, and are also obtained through an output terminal 37a shown in FIG. 2 as sampling pulses. The pulses $\phi_1$ obtained through the output terminal 37a, are supplied to the sampler 13 shown in FIG. 1. Pulses $\phi_2$ shown in FIG. 4(B) are produced through an output terminal 37b of the VCO 35. The pulses $\phi_2$ have the same repetition frequency $f_s$ as the pulses $\phi_1$, and have a phase which differs from the phase of the pulses $\phi_1$ by 180°.

Accordingly, the video signal a is sampled (sampled and held) in the sampler 13, at the sampling frequency $f_s$ which satisfies the equation (1) and is less than twice the upper limit frequency $f_a$. Hence, an output sampled signal of the sampler 13 has a frequency, spectrum b shown in FIG. 3B wherein a frequency aliasing component is included within a band which is indicated by hatchings and exists between the upper limit frequency $f_a$ and a frequency ($f_s-f_a$) which is a difference between the sampling frequency $f_s$ and the upper limit frequency $f_a$. An oval part I in the frequency spectrum b shown in FIG. 3B, is shown in an enlarged scale in a frequency spectrum c shown in FIG. 3C. As shown in FIG. 3C, the frequency spectrums of the aliasing component which are indicated by a phantom line, are located in spacings between the frequency spectrums of the video signal which are indicated by a solid line and are arranged with a spacing of the horizontal scanning frequency $f_H$. In other words, the frequency spectrums of the aliasing component and the frequency spectrums of the video signal are frequency interleaved, and the aliasing component is band-share-multiplexed with the recording video signal.

The sampled signal from the sampler 13 is supplied to a recording circuit 15 which includes a frequency modulator, and is subjected to a signal processing which is required before the recording, such as a frequency modulation process. An output processed signal of the recording circuit 15 is supplied to a rotary head 17 through a switch 16 which is connected to a terminal R, and is accordingly recorded on a magnetic tape 18.

During a reproducing mode, a signal which is reproduced from the magnetic tape 18 by the rotary head 17, is supplied to a reproducing circuit 19 through the switch 16 which is connected to a terminal P. The reproduced signal is subjected to a frequency demodulation in the reproducing circuit 19. The band in which the recording and reproduction can be performed, is determined by the relative speed between the rotary head 17 and the magnetic tape 18, the characteristic of the rotary head 17, or the like. In the portable recording and reproducing apparatus for home use, this band is relatively narrow, and the upper limit frequency is set to a frequency in the range of 2.5 MHz, for example. Thus, when the signal having the frequency spectrum shown in FIG. 3B is recorded on the magnetic tape 18 by the rotary head 17 and reproduced from the magnetic tape 18 by the rotary head 17, a reproduced sampled signal having a frequency spectrum shown in FIG. 3D is obtained from the reproducing circuit 19. As shown in FIG. 3D, the upper limit frequency is in the range of 2.5 MHz, and the aliasing component is band-share-multiplexed with the video signal band which is indicated by hatchings and exists between the frequency ($f_s-f_a$) and the frequency in the range of 2.5 MHz.

The reproduced sampled signal is supplied to the sampling pulse generator 14, a 1H delay circuit 20, a sampler 21, and a lowpass filter 25. The reproduced sampled signal is delayed by one horizontal scanning period (1H) in the 1H delay circuit 20, and is supplied to a sampler 22. The reproduced sampled signal is applied to the input terminal 31 of the sampling pulse generator 14. Similarly as in the case described before, the sampling pulses $\phi_1$ and $\phi_2$ which have the sampling frequency $f_s$ and are in phase with the horizontal synchronizing signal of the reproduced sampled signal, are produced through the respective output terminals 37a and 37b. The sampling pulses $\phi_1$ and $\phi_2$ are supplied to the respective samplers 21 and 22. Because the phases of the sampling pulses $\phi_1$ and $\phi_2$ mutually differ by 180° as shown in FIGS. 4(A) and 4(B), the undelayed reproduced sampled signal and the delayed reproduced sampled signal which has been delayed by 1H are alternately sampled (sampled and held) in the samplers 21 and 22 at the sampling frequency $f_s$. The alternately sampled signals which are obtained from the samplers 21 and 22, are supplied to an adder 23 which adds these sampled signals. The adder 23 produces a reproduced video signal which appears as if it were sampled at a sampling frequency of $2f_s$.

A more detailed description will now be given with respect to the reproduced video signal produced from the adder 23. When the sampled signal which is reproduced by the rotary head 17 is displayed on a screen, information related to a predetermined number of sampling points exists time-sequentially in one scanning line. This predetermined number is approximately equal to a value which is obtained by dividing the sampling frequency $f_s$ by the horizontal scanning frequency $f_H$. However, as described by the equation (1), the sampling frequency $f_s$ is an odd number multiple of $\tfrac{1}{2}$ the horizontal scanning frequency $f_H$. Consequently, the number of sampling points in one scanning line amounts to an integral number plus a fraction of 0.5. For example, when the sampling frequency $f_s$ is equal to 5.011 MHz, the number of sampling points in one scanning lines becomes equal to 318.5. For this reason, in the reproduced picture of the same field, the reproduced sampled signal is displayed such that the information related to 318 sampling points is displayed on one scanning line, and the information related to 319 sampling points is displayed on a subsequent scanning line. In other words, between two adjacent scanning lines, the respective information are displayed at locations which mutually differ by approximately $1/(2f_s)$ in the horizontal scanning direction, and an interlaced picture is obtained.

A reproduced picture 40 of one certain field is shown in FIG. 5. Four arbitrary scanning lines are represented by $l_1, l_2, l_3,$ and $l_4$. The information related to each of the sampling points (FIG. 5 only shows in part) of the (undelayed) reproduced sampled signal which is supplied to the 1H delay circuit 20, are arranged and displayed at locations which are indicated by circles with hatchings. Between two adjacent scanning lines, the display locations mutually differ by a time of $1/(2f_s)$ in the horizontal scanning direction.

On the other hand, the information related to each of the sampling points of the delayed reproduced sampled signal which has been delayed by 1H, are arranged and displayed at locations which are indicated by circles without hatchings in FIG. 5. In other words, the information related to the sampling points of the undelayed reproduced sampled signal, which are displayed at the locations indicated by the circles with the hatchings in FIG. 5, are moved in the vertical direction by one scanning line as indicated by arrows and are displayed at the locations indicated by the circles without the hatchings on the respective subsequent scanning lines.

The information related to each of the sampling points of the reproduced sampled signal from the adder 23, are information composed of the input and output reproduced sampled signals of the 1H delay circuit 20. Thus, the information composed of the input and output reproduced sampled signals of the 1H delay circuit 20, are displayed on the scanning lines $l_1$ through $l_4$ at both the locations indicated by the circles with the hatchings and the locations indicated by the circles without the hatchings. This is essentially equivalent to a case where the reproduced sampled signal being displayed is a signal which has been sampled at a frequency which is twice the sampling frequency $f_s$. Accordingly, the reproduced video signal which is obtained from the adder 23, has a frequency spectrum e shown in FIG. 3E. As shown in FIG. 3E, the folding component III is superimposed for over the frequency of 2.5 MHz, to a frequency spectrum II of the original video signal under 2.5 MHz. As a result, a reproduced video signal having a band which is wider than the recording and reproducing band of the recording and reproducing system, is obtained from the adder 23. This reproduced signal from the adder 23 is supplied to a highpass filter 24 wherein a high-frequency component over a frequency in the range of $(f_s-f_a)$, for example, is frequency-selected and supplied to a mixer 26.

On the other hand, the reproduced sampled signal from the reproducing circuit 19, is supplied to the lowpass filter 25 wherein a low-frequency component under a frequency in the range of $(f_s-f_a)$, for example, is frequency-selected and supplied to the mixer 26. The vertical resolution of the reproduced video signal from the adder 23 is deteriorated. For this reason, the low-frequency component which determines the vertical resolution, is eliminated in the highpass filter 24. On the other hand, the low-frequency component within the reproduced sampled signal which has not yet been sampled and held in the sampler 21, is obtained from the lowpass filter 25 and is mixed with the output signal of the highpass filter 24 in the mixer 26, so as to compensate for the low-frequency component. Therefore, it is possible to compensate for the deterioration in the vertical resolution. An output of the mixer 26 is produced through an output terminal 27 as a reproduced video signal.

The present invention is not limited to the embodiment described heretofore, and for example, a circuit part made up of the highpass filter 24, the lowpass filter 25, and the mixer 26 may be omitted, although the vertical resolution of the reproduced video signal becomes poor in this case. In this case, the reproduced video signal is obtained directly from the adder 23.

Further, the present invention is not limited to the embodiment described heretofore, and various variations and modifications may be made without departing from the scope of the present invention.

What is claimed is:

1. An apparatus for recording and reproducing a video signal on and from a recording medium, said video signal being accompanied by synchronizing signals but not by other multiplexed signals, said apparatus comprising:

a sampling pulse generator supplied with a video signal, for producing sampling signals $\phi_1$ and $\phi_2$ which are in phase with a horizontal synchronizing signal of the video signal and mutually differ in phase by 180°, each of said sampling signals $\phi_1$ and $\phi_2$ having a frequency $f_s$ which satisfies an equation $$f_s=(2n+1)f_H/2,$$

where n is and integer anf $f_H$ is a horizontal scanning frequency of the video signal;

first sampling means for sampling a recording video signal which is to be recorded by the sampling signal $\phi_1$ which is produced by said sampling pulse generator when said sampling pulse generator is supplied with said recording video signal, said recording video signal having a band with an upper limit frequency $f_a$, said frequencies $f_a$ and $f_s$ satisfying a relation $f_a<f_s<2f_a$;

recording and reproducing means for recording an output signal of said first sampling means on the recording medium and for reproducing the signal from the recording medium;

delay means for delaying a reproduced video signal which is reproduced from the recording medium by said recording and reproducing means by a delay time of one horizontal scanning period;

second sampling means for alternately sampling input and output signals of said delay means by the sampling signals $\phi_1$ and $\phi_2$ which are produced by said sampling pulse generator when said sampling pulse generator is supplied with said reproduced video signal, said second sampling means comprising a first sampler for sampling the input signal of said delay means by the sampling signal $\phi_1$, and a second sampler for sampling the output signal of said delay means by the sampling signal $\phi_2$; and adding means for adding alternately sampled signals from said second sampling means, and for obtaining a reproduced output signal which has essentially been sampled at a frequency of $2f_s$.

2. An apparatus as claimed in claim 1, further comprising a highpass filter for eliminating a low-frequency component of an output of said adding means and for passing a high-frequency component of the output of said adding means, a lowpass filter for passing a low-frequency component of said reproduced video signal, and mixing means for mixing outputs of said highpass filter and said lowpass filter so as to obtain the reproduced output signal.

3. An apparatus as claimed in claim 1 in which said sampling pulse generator comprises a circuit for separating the horizontal synchronizing signal from the video signal supplied thereto, a first frequency dividing circuit for frequency-dividing the separated horizontal synchronizing signal having the frequency $f_H$ by ½, and a phase locked loop supplied with an output of said frequency dividing circuit, for producing two sampling signals which have the frequency $f_s$ and mutually differ in phase by 180°, and said phase locked loop comprises a phase comparator supplied with the output of said frequency dividing circuit, a voltage controlled oscillator controlled of its oscillation frequency responsive to an output of said phase comparator, for producing said two sampling signals, and a second frequency divider supplied with one of said two sampling signals produced from said voltage controlled oscillator, for frequency-dividing the one sampling signal by $1/(2n+1)$.

4. A video signal recording and reproducing apparatus as claimed in claim 1 which further comprises a highpass filter for eliminating a low-frequency component of an output of said adding means and for passing a high-frequency component of the output of said adding means, a lowpass filter for passing a low-frequency component of the signal which is reproduced by said recording and reproducing means, and mixing means for mixing outputs of said highpass filter and said lowpass filter so as to obtain the reproduced output signal.

5. A reproducing apparatus as claimed in claim 1 in which a recording and reproducing band of said recording and reproducing means is narrower than a band of the output signal of said first sampling means.

6. An apparatus as claimed in claim 1 in which an aliasing component exists in spacings between video signals which exist with a spacing of the frequency $f_H$ of said horizontal synchronizing signal within the output signal of said first sampling means.

* * * * *